(12) United States Patent
Klinkhammer

(10) Patent No.: US 10,710,428 B2
(45) Date of Patent: Jul. 14, 2020

(54) ROTARY SHAFT ASSEMBLY WITH NESTED SHAFT

(71) Applicant: DENSO International America, Inc., Southfield, MI (US)

(72) Inventor: John Klinkhammer, Livonia, MI (US)

(73) Assignee: DENSO International America, Inc., Southfield, MI (US)

( * ) Notice: Subject to any disclaimer, the term of this patent is extended or adjusted under 35 U.S.C. 154(b) by 308 days.

(21) Appl. No.: 15/717,990

(22) Filed: Sep. 28, 2017

(65) Prior Publication Data

US 2019/0092126 A1   Mar. 28, 2019

(51) Int. Cl.
*B60H 1/00* (2006.01)
*F16K 11/12* (2006.01)

(52) U.S. Cl.
CPC ..... *B60H 1/00685* (2013.01); *B60H 1/00021* (2013.01); *B60H 1/00692* (2013.01); *F16K 11/12* (2013.01); *B60H 2001/00185* (2013.01); *B60H 2001/00707* (2013.01)

(58) Field of Classification Search
CPC ............ B60H 1/00685; B60H 1/00021; B60H 1/00692; B60H 2001/00185; B60H 2001/00707; F16K 11/12
See application file for complete search history.

(56) References Cited

U.S. PATENT DOCUMENTS

| | | | | |
|---|---|---|---|---|
| 4,216,822 A | * | 8/1980 | Izumi | B60H 1/0005 165/42 |
| 5,350,335 A | * | 9/1994 | Andersson | B60H 1/00685 454/121 |
| 5,399,120 A | * | 3/1995 | Burns | B60H 1/00685 454/121 |
| 7,530,889 B2 | | 5/2009 | Marshall et al. | |
| 2002/0009968 A1 | * | 1/2002 | Tsurushima | B60H 1/00692 454/121 |
| 2006/0254295 A1 | * | 11/2006 | Kim | B60H 1/00685 62/239 |
| 2007/0012007 A1 | | 1/2007 | Chung et al. | |
| 2008/0295992 A1 | | 12/2008 | Shindoh | |
| 2012/0034859 A1 | * | 2/2012 | Meehan | B60H 1/00685 454/152 |
| 2017/0120722 A1 | * | 5/2017 | Cho | B60H 1/00685 |
| 2017/0320372 A1 | * | 11/2017 | Aizawa | B60H 1/00521 |

FOREIGN PATENT DOCUMENTS

WO    2002012007 A1    2/2001

* cited by examiner

*Primary Examiner* — Jon T. Schermerhorn, Jr.

(57) ABSTRACT

A rotary shaft assembly includes an outer shaft, an outer opening being formed on a circumferential wall of the outer shaft, and a nested shaft which is rotatably supported within the outer shaft, a nested opening being formed on a circumferential wall of the nested shaft. The nested shaft and the outer shaft are configure to be rotatable with respect to each other about a common axis such that a relative rotation angle between the outer shaft and the nested shaft varies.

10 Claims, 5 Drawing Sheets

ROTARY SHAFT ASSEMBLY WITH NESTED SHAFT

TECHNICAL FIELD

The present disclosure relates to a rotary shaft assembly with a nested shaft for use with a ventilation system.

BACKGROUND

Heating, ventilation, and air conditioning (HVAC) systems are widely used. In certain applications, such as automotive, it may be desirable to reduce the size of the HVAC system while improving the functionality of the HVAC system.

SUMMARY

According to an aspect of the present disclosure, a rotary shaft assembly includes an outer shaft and a nested shaft disposed within the outer shaft. An outer opening is formed on a circumferential wall of the outer shaft, and a nested opening is formed on a circumferential wall of the nested shaft. The nested shaft is rotatably supported within the outer shaft.

DETAILED DESCRIPTION

First Embodiment

A first embodiment of the present disclosure will be described with reference to FIGS. 1 to 4.

Figure 1:
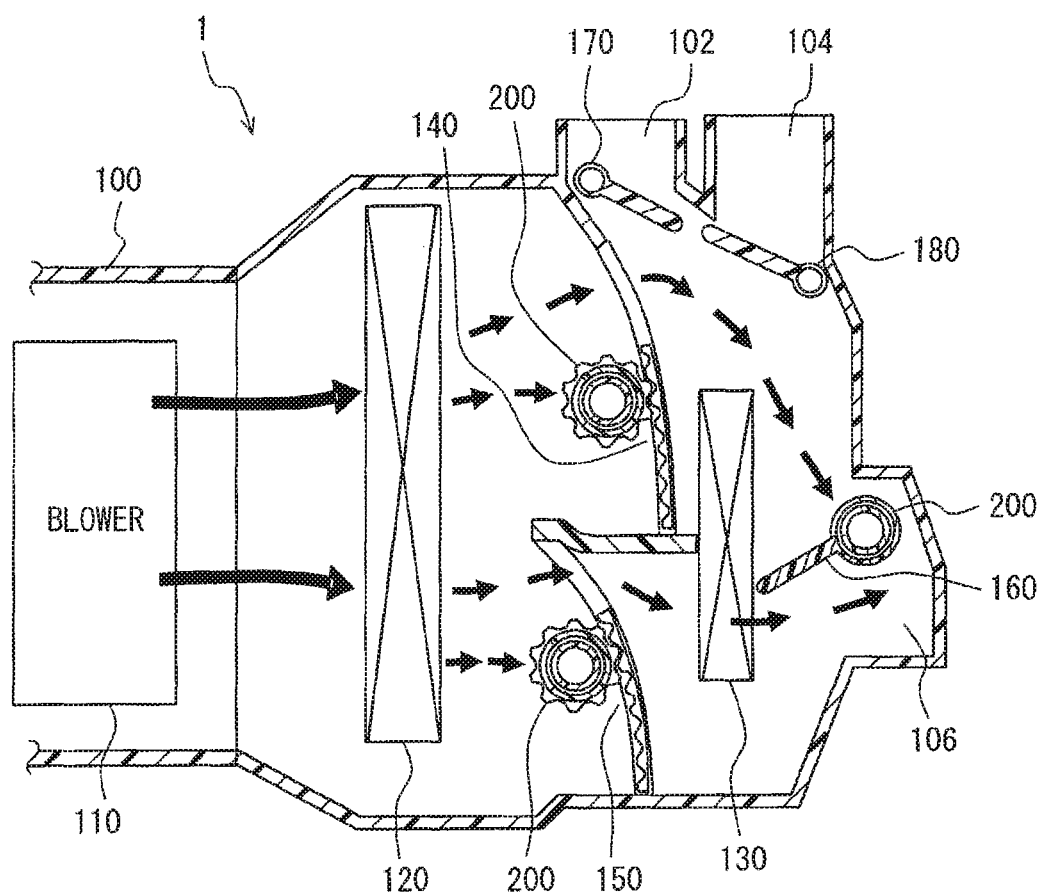
FIG. 1 is a cross sectional view of an HVAC system.

FIG. 1 shows a cross sectional view of an HVAC system 1. In the present embodiment, the HVAC system 1 is equipped within a vehicle (not shown). However, this is not intended to be limiting and the HVAC system 1 may alternatively be equipped to permanent facilities such as a building. As shown in FIG. 1, the HVAC system 1 includes a housing 100, a blower 110, an evaporator 120, a heater 130, slide doors 140, 150, and rotary doors 160, 170, 180. It should be noted that FIG. 1 is not intended to be limited to depicting the sizes and relative positions of the various components to exact scale, and a variety of adjustments may be made as appropriate depending on design requirements. The same applies to the other figures of the present disclosure.

The housing 100 is preferably made of a rigid metal or polymer material, and houses the other components of the HVAC system 1. The housing 100 includes air vents 102, 104, 106. Each air vent 102, 104, 106 is preferably integrally formed in the wall of housing 100, and allows air to exit the HVAC system 1. For example, when the HVAC system 1 is equipped within a vehicle, the air vents 102, 104, 106 may direct air toward the windshield, the upper body of a passenger, or the lower body of a passenger.

The blower 110 is configured to blow intake air in an airflow direction as shown by the arrows in FIG. 1. The blower 110 may be a propeller type blower, a centrifugal type blower, a tubular type blower, or other appropriate type of blower. The blower 110 is preferably controlled by an electronic control unit (not shown) of the vehicle.

The evaporator 120 is disposed downstream of the blower 110 in the airflow direction, and is part of a refrigeration cycle (not shown) which includes typical refrigeration cycle components such as an expansion valve, a compressor, and so on. The evaporator 120 is configured to exchange heat between air blown by the blower 110 and an internal coolant which has been cool by the refrigeration cycle. As a result, the evaporator 120 cools the air blown by the blower 110.

The heater 130 is disposed downstream of the evaporator 120, and is configured to heat the air flowing past the heater 130. In the present embodiment, the heater 130 is part of same the refrigeration cycle as the evaporator 120, and therefore is configured to exchange heat between air and an internal coolant (not shown) which has been heated by the refrigeration cycle. However, the heater 130 may alternatively be implemented as an electric heater or other type of heater which may operate independently of a refrigeration cycle.

The slide doors 140, 150 are disposed along the airflow direction within the housing 100, and are configured to direct the path of the air flowing within the housing 100. In other words, the slide doors 140, 150 function as so-called air-mix doors. In particular, the slide doors 140, 150 are disposed downstream of the evaporator 120, and are configured to slide along a slot to either direct air toward the heater 130 or direct air to bypass the heater 130. As illustrated, each slide door 140, 150 is coupled to a respective rotary shaft assembly 200 as a rack and pinion system, such that rotation in the rotary shaft assembly 200 is converted to linear motion in the slide doors 140, 150.

The rotary doors 160, 170, 180 are disposed adjacent to the entrances of respective vents. Specifically, the rotary door 160 is disposed adjacent to the vent 106, the rotary door 170 is disposed adjacent to the vent 102, and the rotary door 180 is disposed adjacent to the vent 104. The rotary doors 160, 170 180 are configured to rotate, thereby selectively permitting or prohibiting air from entering their respective vents. As illustrated, the rotary door 160 is also coupled to a rotary shaft assembly 200. In particular, the rotary door 160 is directly attached to its respective rotary shaft assembly 200.

In the present embodiment, each rotary shaft assembly 200 shown in FIG. 1 has the same configuration as each other aside from their door coupling mechanism. As shown in FIG. 1, the rotary shaft assemblies 200 coupled to the slide doors 140, 150 are equipped with gear teeth, while the rotary shaft assembly 200 is coupled to the rotary door 160 is simply directly attached to the rotary door 160. In other words, the rotary shaft assemblies 200 may be selectively applied to a variety of door types, by appropriately modifying its door coupling mechanism. In the following explanations, the rotary shaft assembly 200 will be described in generic terms, without being limited to any specific coupling mechanism.

Figure 2:
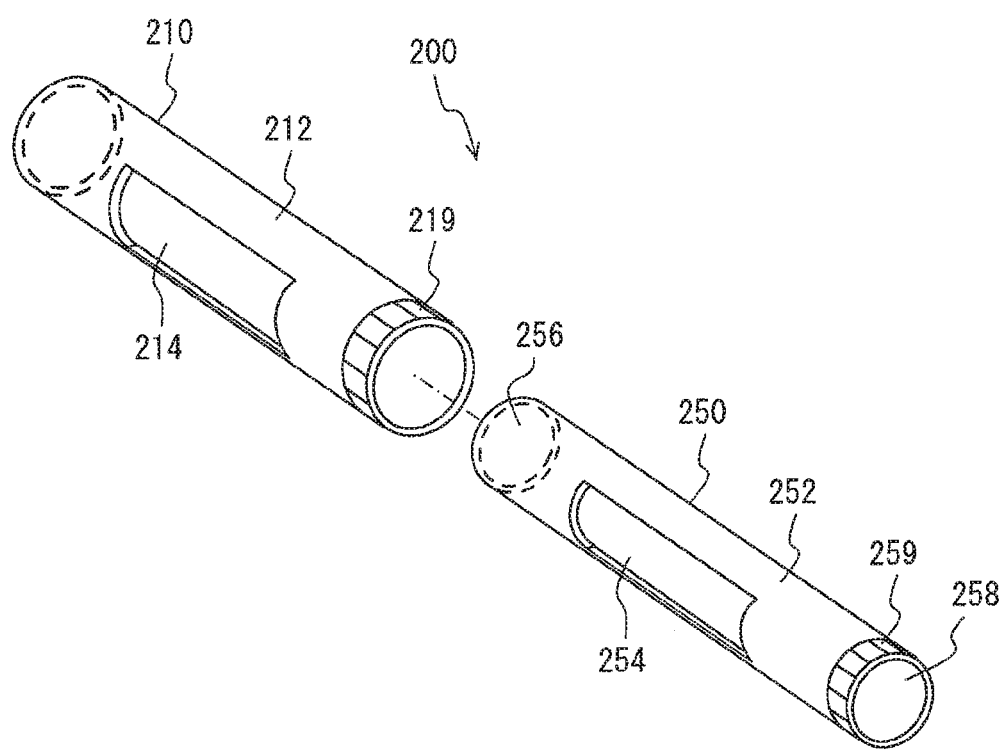
FIG. 2 is an exploded view of a rotary shaft assembly.

In FIG. 1, the arrows illustrate the flow of air within the HVAC system 1. As illustrated, aside from being directed by the various doors, the air within the HVAC system 1 may also flow directly into each rotary shaft assembly 200. The details of this mechanism will be described with reference to FIGS. 2 to 4. FIG. 2 is an exploded perspective view showing the rotary shaft assembly 200 in detail. As shown, the rotary shaft assembly 200 includes an outer shaft 210 and a nested shaft 250.

The outer shaft 210 is hollow to define a first passage 212 within the outer shaft 210. An outer opening 214 is formed on the circumferential wall of the outer shaft 210. The outer opening 214 opens into the first passage 212. In addition, an outer engagement portion 219 is formed on one end of the outer shaft 210. The outer engagement portion 219 is configured to be engaged with, e.g., an actuator as will be described later.

The nested shaft 250 is configured to be disposed within the outer shaft 210. In particular, the nested shaft 250 is configured to be rotatably supported within the first passage 212 of the outer shaft 210. The outer shaft 210 and the nested shaft 250 are preferably coaxial so as to share a common axis, but this is not limiting and other arrangements are contemplated. For example, the nested shaft 250 may be loosely fitted within the outer shaft 210, or be supported by a bearing member (not illustrated) disposed within the outer shaft 210. The nested shaft 250 is also hollow to define a second passage 252 within the nested shaft 250. A nested opening 254 is formed on the circumferential wall of the nested shaft 250. The nested opening 254 opens into the second passage 252. In addition, a nested engagement portion 259 is formed on one end of the nested shaft 250. The nested engagement portion 259 is configured to be engaged with, e.g., an actuator as will be described later.

Here, the nested shaft 250 includes a first open end 256 and a second open end 258, both of which open into the second passage 252. In other words, the nested opening 254, first open end 256, and the second open end 258 are all in fluid communication with each other through the second passage 252. It should be noted that the outer shaft 210 is also open-ended. However, since the nested shaft 250 is disposed within the outer shaft 210, the open ends of the outer shaft 210 are effectively the same as the open ends of the nested shaft 250, and therefore are omitted from description herein.

Figure 3:
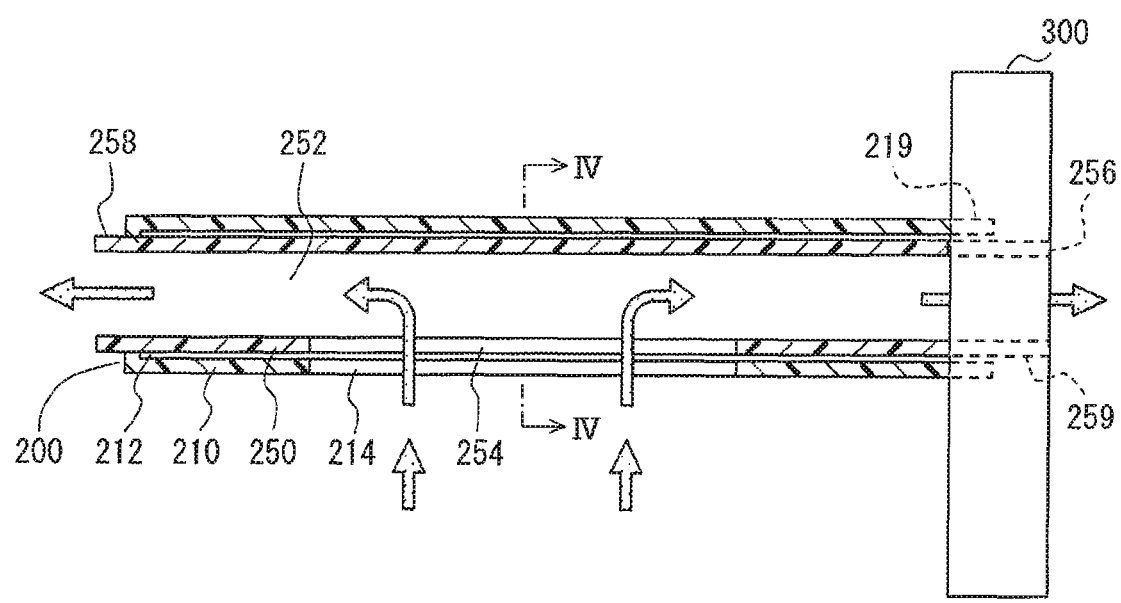
FIG. 3 is a cross sectional view of a rotary shaft assembly and an actuator

FIG. 3 shows an assembled view of the rotary shaft assembly 200. As mentioned previously, the nested shaft 250 is disposed within the outer shaft 210 and is rotatably supported within the first passage 212. The second open end 258 of the nested shaft 250 protrudes out from the outer shaft 210, such that both the outer engagement portion 219 of the outer shaft 210 and the nested engagement portion 259 of the nested shaft 250 are exposed. The first open end 256 of the nested shaft 250 also protrudes out from the outer shaft 210. However, this is not intended to be limiting, and in an alternative implementation, the first open end 256 may be flush with the outer shaft 210, or may be receded within the outer shaft 210.

In the present embodiment, the rotary shaft assembly 200 is coupled to an actuator 300. As shown in FIG. 3, the outer engagement portion 219 of the outer shaft 210 and the nested engagement portion 259 of the nested shaft 250 are inserted into the actuator 300. The nested engagement portion 259 of the nested shaft 250 protrudes out from the outer shaft 210 to be exposed to the actuator 300. The actuator 300 is configured to engage the outer engagement portion 219 of the outer shaft 210 and the nested engagement portion 259 of the nested shaft 250 to independently rotate the outer shaft 210 and the nested shaft 250. In particular, the actuator 300 is configured to vary a relative rotation angle between the outer shaft 210 and the nested shaft 250, as will be explained later. When the HVAC system 1 is mounted in a vehicle, the actuator 300 may be controlled by an ECU of the vehicle.

FIG. 3 shows the rotary shaft assembly 200 in a state where the outer opening 214 overlaps with the nested opening 254. In this state, the outer opening 214 is in fluid communication with the first open end 256 and the second open end 258 of the nested shaft 250, as illustrated by the arrows in FIG. 3. In other words, air (or other types of fluid) from outside of the outer shaft 210 is allowed to enter through the outer opening 214 and the nested opening 254, then flow through the second passage 252 and then flow out of the first open end 256 and the second open end 258 of the nested shaft 250. Depending on the desired application, the first open end 256 and the second open end 258 of the nested shaft 250 may be fluidly connected, for example through an air hose (not illustrated), to a variety of auxiliary devices or compartments in order to supply conditioned air.

Figure 4A:
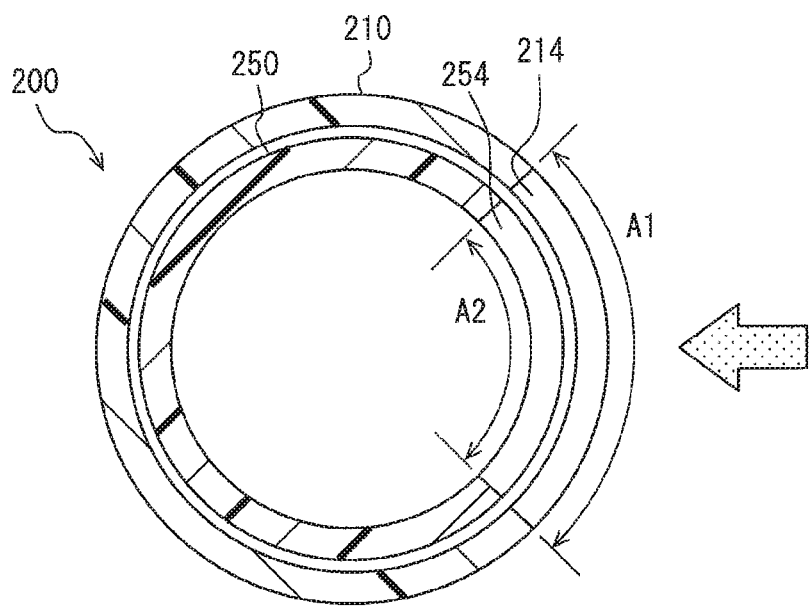
FIG. 4A is a cross sectional view of a rotary shaft assembly when open.
Figure 4B:
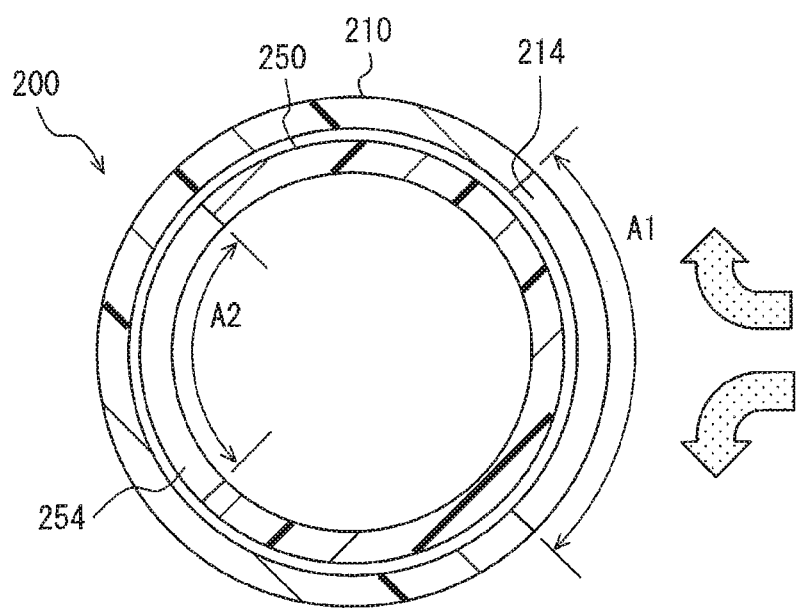
FIG. 4B is a cross sectional view of a rotary shaft assembly when closed.

FIGS. 4A and 4B are cross sectional views showing the rotary shaft assembly 200 at two different relative rotation angles between the outer shaft 210 and the nested shaft 250. In the present embodiment, the outer opening 214 of the outer shaft 210 is formed in an arc shape having an angle (i.e., arc measure) A1. The nested opening 254 of the nested shaft 250 is formed in an arc shape having an angle A2.

FIG. 4A shows the rotary shaft assembly 200 in a state where the outer opening 214 and the nested opening 254 overlap with each other along the circumferential direction. In this state, air (or other fluids) outside of the outer shaft 210 is allowed to enter through the outer opening 214 and the nested opening 254 to enter the nested shaft 250. In other words, FIG. 4A shows the rotary shaft assembly 200 in a similar state as that of FIG. 3. In the following discussions, this state may be referred to as the rotary shaft assembly 200 being "open".

In contrast, FIG. 4B shows the rotary shaft assembly 200 in a state where the outer opening 214 is offset from the nested opening 254 along the circumferential direction. In this state, air (or other fluids) outside of the outer shaft 210 is fluidly blocked from entering the nested shaft 250. In the following discussions, this state may be referred to as the rotary shaft assembly 200 being "closed". It should be noted that in practice, even if the rotary shaft assembly 200 is closed, a small amount of air may enter the outer opening 214 and then enter in between the circumferential walls of the outer shaft 210 and the nested shaft 250. However, this is generally an insignificant amount of air and therefore is omitted from consideration in the present disclosure.

It should be noted that the angles A1, A2 depicted in FIGS. 4A and 4B are exemplary and not intended to be limiting. For instance, while FIGS. 4A and 4B show the angles A1, A2 of the outer opening 214 and the nested opening 254 as being equal, these angles A1, A2 may be different from each other instead. In particular, the sizes of the angles A1, A2 may be adjusted as appropriate, as long as the sum of the angles A1 and A2 does not exceed 360 degrees (since the outer opening 214 could not be offset from the nested opening 254 in such a case). For example, the angle A1 of the outer opening 214 may be increased to allow a greater rotation range over which air is allowed to enter the outer opening 214. As another example, the angle A2 of the nested opening 254 may be reduced to limit the flow rate of air entering the nested shaft 250.

In the present disclosure, the terms "overlap" and "offset" are intended to denote states of fully overlapping and fully offset. For instance, if the angles A1, A2 of the outer opening 214 and the nested opening 254 are equal, then the outer opening 214 and the nested opening 254 are considered to be overlapping when they are in total alignment (typical measurement errors, control errors, etc. permitting).

If the angles A1, A2 of the outer opening 214 and the nested opening 254 are not equal, then the outer opening 214 and the nested opening 254 are considered to be overlapping when the smaller one of the two openings is entirely enveloped by the larger of the two openings. Similarly, the outer opening 214 and the nested opening 254 are considered to be offset from each other when no overlapping occurs. Any state other than overlapping and offset as defined above may be referred to as "partially overlapping" or "partially offset".

The nested shaft 250 is configured to be rotatable between at least the state shown in FIG. 4A and the state shown in FIG. 4B. Preferably, the nested shaft 250 is configured to be rotatable over at least a full rotation, i.e., 360 degrees, so as to include various states of partial overlapping as well.

Returning to FIG. 3, the rotary shaft assembly 200 is configured to be rotated by the actuator 300. In the present embodiment, the actuator 300 is configured to independently rotate the outer shaft 210 and the nested shaft 250 to control a relative rotation angle between the outer shaft 210 and the nested shaft 250.

In particular, the actuator 300 is configured to independently control the rotation of the outer shaft 210 to open or close a door, such as the slide doors 140, 150 or the rotary door 160, thereby adjusting the flow of air through the HVAC system 1. For example, an external ECU may control the actuator 300 to rotate the outer shaft 210 in accordance with air conditioning needs. In other words, the outer shaft 210 may be controlled to operate doors in a conventional manner, i.e., without considering the relative rotation angle between the outer shaft 210 and the nested shaft 250.

Then, after the outer shaft 210 is rotated to a desired rotation position (e.g., after opening or closing an air-mix door), the actuator 300 then independently controls the rotation of the nested shaft 250 to set the relative rotation angle between the outer shaft 210 and the nested shaft 250 to open or close the rotary shaft assembly 200 as needed. For example, if the first open end 256 of the nested shaft 250 is fluidly connected to a glove box, the actuator 300 rotates the nested shaft 250 such that the rotary shaft assembly 200 is open when an external ECU determines that the glove box should be cooled.

It should be noted that while the outer shaft 210 and the nested shaft 250 are controlled independently, the outer shaft 210 and the nested shaft 250 may nevertheless be controlled contemporaneously. For example, when the relative rotation angle between the outer shaft 210 and the nested shaft 250 is to be maintained at a constant value, the nested shaft 250 may be controlled to rotate together with the outer shaft 210, thereby maintaining a constant relative rotation angle between the outer shaft 210 and the nested shaft 250.

In the present embodiment, the rotary shaft assembly 200 includes the outer shaft 210 which defines the first passage 212, the outer opening 214 being formed on a circumferential wall of the outer shaft 210, and the nested shaft 250 which defines a second passage 252 and which is rotatably supported within the first passage 212 of the outer shaft 210, the nested opening 254 being formed on a circumferential wall of the nested shaft 250. The nested shaft 250 and the outer shaft 210 are configure to be rotatable with respect to each other about a common axis such that a relative rotation angle between the outer shaft 210 and the nested shaft 250 varies between a first angle at which the outer opening 214 overlaps with the nested opening 254, and a second angle at which the outer opening 214 is offset from the nested opening 254.

As a result of this configuration, the air within the HVAC system 1 may flow directly into each rotary shaft assembly 200, as shown by the arrows in FIG. 1. More specifically, the air within the HVAC system 1 may flow through each rotary shaft assembly 200 and out toward various auxiliary device or compartments.

In a comparative example, if the rotary shaft assemblies 200 are not provided, then additional vents or ports may need to be formed in the housing 100 to supply conditioned air to auxiliary devices or compartments. The number of such vents or ports may be limited due to space constraints. Further, such vents or ports may require additional mounting space both inside and outside of the housing 100, therefore increasing the overall space requirements for mounting the HVAC system 1. In this regard, when compared to the comparative example, the HVAC system 1 of the present embodiment, which is provided with the rotary shaft assemblies 200, may supply heated, cooled, or conditioned air to a greater number of auxiliary devices or compartments, and may be manufactured to be more space efficient.

Second Embodiment

A second embodiment of the present disclosure will be described with reference to FIGS. 5 and 6. Elements which are similar or identical to those of the first embodiment will be denoted with the same reference numerals, and explanations thereof may be shortened or omitted for brevity.

Figure 5:
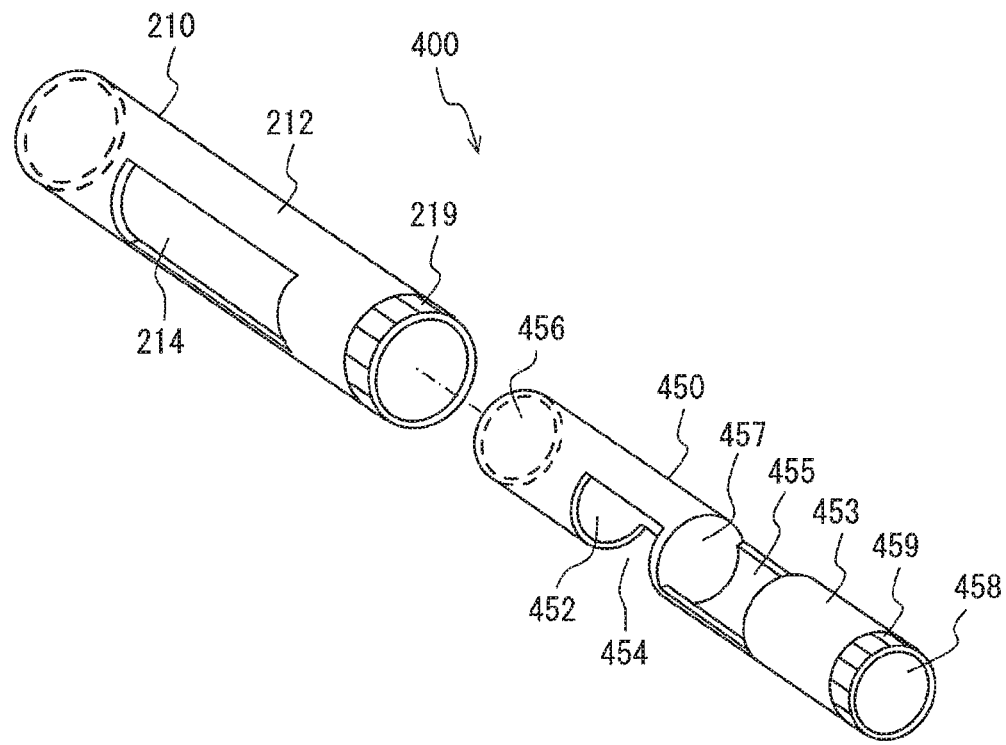
FIG. 5 is an exploded view of a rotary shaft assembly.

FIG. 5 is an exploded view showing a rotary shaft assembly 400 according to the second embodiment. As illustrated, the rotary shaft assembly 400 includes an outer shaft 210 and a nested shaft 450. The configuration of the outer shaft 210 is the same as that of the first embodiment.

The nested shaft 450 is configured to be disposed within the outer shaft 210. In particular, the nested shaft 450 is configured to be rotatably supported within the first passage 212 of the outer shaft 210. For example, the nested shaft 450 may be loosely fitted within the outer shaft 210, or be supported by a bearing member (not illustrated) disposed within the outer shaft 210.

The nested shaft 450 is hollow. A partition wall 457 is disposed in the center portion of the nested shaft 450 to divide the inside of the nested shaft 450 into a first nested passage 452 and a second nested passage 453. A first nested opening 454 that opens into the first nested passage 452 is formed on the circumferential wall of the nested shaft 450. A second nested opening 455 that opens into the second nested passage 453 is formed on the circumferential wall of the nested shaft 450. The nested shaft 450 also includes a first open end 456 which opens into the first nested passage 454 and a second open end 458 which opens into the second nested passage 455. In addition, a nested engagement portion 459 is formed on one end of the nested shaft 450. As shown in FIG. 5, the first nested opening 454 and the second nested opening 455 are partially offset from each other in the circumferential direction.

The rotary shaft assembly 400 is configured to be coupled to the actuator 300 in a similar manner as in the first embodiment. As such, explanations of this will be omitted for brevity.

Figure 6:
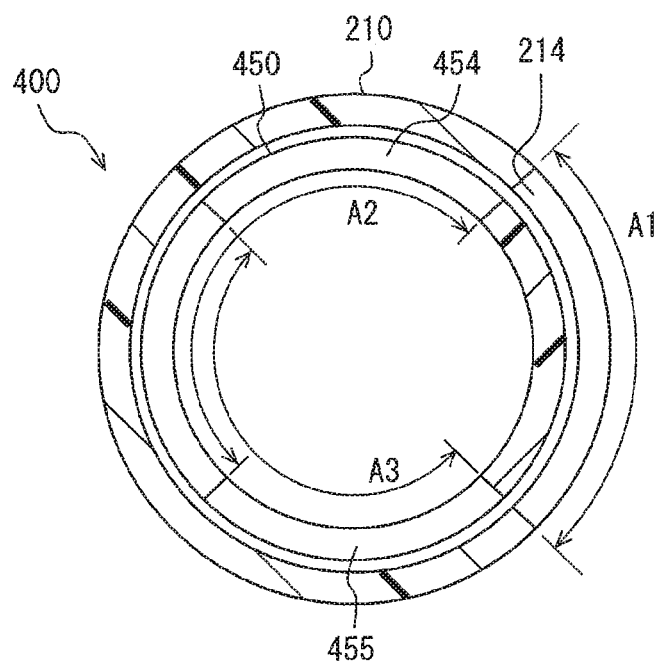
FIG. 6 is a cross sectional view of a rotary shaft assembly when closed.

FIG. 6 is a cross sectional view showing the rotary shaft assembly 400. In the present embodiment, the outer opening 214 of the outer shaft 210 is formed in an arc shape having an angle (i.e., arc measure) A1. The first nested opening 454 of the nested shaft 450 is formed in an arc shape having an angle A2. The second nested opening 455 of the nested shaft 450 is formed in an arc shape having an angle A3. In the state shown in FIG. 6, the outer opening 214 is offset from both the first nested opening 454 and the second nested opening 455. In this state, similar to the state shown in FIG. 4B of the first embodiment, both the first open end 456 and the second open end 458 of the nested shaft 450 are fluidly blocked from the outer opening 214.

In addition, as mentioned previously, the first nested opening 454 and the second nested opening 455 are partially offset from each other in the circumferential direction. This is illustrated in FIG. 6 by the angle A1 partially overlapping with the angle A2. In this regard, the nested shaft 450 and the outer shaft 210 are configure to be rotatable with respect to each other about a common axis such that a relative rotation angle between the outer shaft 210 and the nested shaft 450 varies between a first angle at which the outer opening 214 overlaps with the first nested opening 454 and the outer opening 214 is offset from the second nested opening 455, a second angle at which the outer opening 214 overlaps with both the first nested opening 454 and the second nested opening 455, and a third angle at which the outer opening 214 is offset from the first nested opening 454 and the outer opening 214 overlaps with the second nested opening 455.

When the relative rotation angle between the outer shaft 210 and the nested shaft 450 is at the first angle, the first open end 456 is in fluid communication with the outer opening 214 and the second open end 458 is fluidly blocked from the outer opening 214. When the relative rotation angle between the outer shaft 210 and the nested shaft 450 is at the second angle, the first open end 456 is in fluid communication with the outer opening 214 and the second open end 458 is in fluid communication with the outer opening 214. When the relative rotation angle between the outer shaft 210 and the nested shaft 450 is at the third angle, the first open end 456 is fluidly blocked from the outer opening 214 and the second open end 458 is in fluid communication with the outer opening 214.

As a result of this configuration, the air within the HVAC system 1 may flow directly into each rotary shaft assembly 200, and in addition, this air may be directed to flow out of only the first open end 456, only the second open end 458, or both the first open end 456 and the second open end 458. This allows the rotary shaft assembly 200 to be more flexible in directing conditioned air toward auxiliary devices or compartments. For example, the rotary shaft assembly 200 may be controlled (e.g., by an external ECU) such that when receiving cooled air, only the first open end 456 is open, and when receiving heated air, only the second open end 458 is open. In this regard, the HVAC system 1 of the present embodiment may supply heated, cooled, or conditioned air to a greater number of auxiliary devices or compartments, and may be manufactured to be more space efficient.

Other Embodiments

The present disclosure is described with reference to the above embodiments, but these embodiments are not intended to be limiting. A variety of modifications which do not depart from the gist of the present disclosure are contemplated.

In the above described embodiments, the rotary shaft assembly is described as being open when the outer opening overlaps with the nested opening or nested openings. However, this is not intended to be limiting, and the rotary shaft assembly may be considered to be open as long as the outer opening partially overlaps with a nested opening, such that airflow into the rotary shaft assembly is permitted.

In the above described embodiments, the outer shaft and the nested shaft are illustrated as including a specific number of openings. For instance, in FIG. 2, the outer shaft is shown as including a single outer opening, and the nested shaft is illustrated as including a single nested opening. However, in alternative embodiments, any of the outer shaft and the nested shaft may be formed with two or more openings instead. In addition, the number of openings formed on the outer shaft and the nested shaft are not necessarily equal, and may be different from each other, as long as the openings in the outer shaft and the nested shaft may be at least partially overlapped with each other.

In the above described embodiments, the nested shaft is described as including the first open end and the second open end, thereby allowing conditioned air to exit out of both ends of the rotary shaft assembly. However, in alternative embodiments, the nested shaft may include only of the first open end, or only the second open end, such that conditioned air only exits out of one end of the rotary shaft assembly.

In the above described embodiments, the outer shaft and the nested shaft are described as being engaged to the actuator through the engagement portions. However, a variety of alternative engagement types are contemplated, as long as the actuator is able to engage the outer shaft and the nested shaft. For example, instead of the engagement portions, gear teeth may be provided on the outer surfaces of the outer shaft and the nested shaft, and the actuator may engage these gear teeth instead. As another example, the outer shaft and the nested shaft may be controlled by a mechanical linkage, e.g., a pin and groove linkage system.

In the above described embodiments, the rotary shaft assembly is described as being coupled to the actuator which independently rotates the outer shaft and the nested shaft. In alternative embodiments, the rotary shaft assembly may instead be connected to separate actuators which independently control respective ones of the outer shaft and the nested shaft. In such a case, one of the actuators may be a conventional type which controls the outer shaft based on conventional door control needs, while another one of the actuators may be a specialized actuator which controls the nested shaft to open or close the rotary shaft assembly.

In the above description, the second embodiment is described as including a partition wall. However, the partition wall may also be applied to the first embodiment as well. For instance, in the first embodiment, the outer opening of the outer shaft may be divided along the axial direction of the outer shaft into two outer openings, and a partition wall may be disposed between the two outer openings such that each outer opening is only fluidly connected to one end of the outer shaft.

In the second embodiment, the outer shaft is provided with a single outer opening, while the nested shaft is provided with the first nested opening and the second nested opening. However, this arrangement may be reversed, such that the outer shaft is provided with two partially offset openings while the nested shaft is provided with a single opening.

In the second embodiment, the first nested opening and the second nested opening are partially offset from each other in the circumferential direction. In an alternative embodiment, the first nested opening and the second nested opening may be completely offset from each other in the circumferential direction.

The outer opening(s) and nested opening(s) described herein are illustrated as having a square outline. In alternative embodiments, these openings may have any type of outlines, such as circular, elliptical, or irregular, as long as fluid may be selected allowed to enter the rotary shaft assembly.

The use of terms such as "first", "second", "third", or "fourth" is solely for the purpose of identification, and is not intended to limit the order or relationships of applicable elements.

The invention claimed is:

1. A rotary shaft assembly for a door, the rotary shaft assembly, together with the door, disposed in a fluid passage through which a fluid flows, the rotary shaft assembly comprising:
    an outer shaft defining a first passage therein; and
    a nested shaft defining a second passage therein, located inside the outer shaft, and rotatably supported within the first passage of the outer shaft, wherein
    the outer shaft has an outer opening formed on a circumferential wall of the outer shaft,
    the nested shaft has:
        a nested opening formed on a circumferential wall of the nested shaft; and
        an open end at one longitudinal side of the nested shaft along a longitudinal direction of the nested shaft,
    the nested shaft and the outer shaft are configure to be rotatable with respect to each other about a common axis such that a relative rotation angle between the outer shaft and the nested shaft varies between a first angle and a second angle,
    when the relative rotation angle is the first angle, (i) the nested opening overlaps with the outer opening and takes the fluid into the second passage from the fluid passage through the outer opening and (ii) the open end discharges the fluid from the second passage, and
    when the relative rotation angle is the second angle, the outer opening and the nested opening are offset from each other and block a flow of the fluid from the fluid passage to the second passage.

2. The rotary shaft assembly of claim 1, further comprising:
    an actuator configured to vary the relative rotation angle between the outer shaft and the nested shaft.

3. The rotary shaft assembly of claim 2, wherein
    the actuator is coupled to the outer shaft and is configured to rotate the outer shaft.

4. The rotary shaft assembly of claim 2, wherein
    the actuator is coupled to the nested shaft and is configured to rotate the nested shaft.

5. The rotary shaft assembly of claim 1, wherein
    the nested shaft includes another open end at another longitudinal side of the nested shaft along the longitudinal direction, and
    when the relative rotation angle is the first angle, each of the open end and the other open end discharges the fluid from the second passage.

6. The rotary shaft assembly of claim 1, wherein
    an outer engagement portion is disposed on the circumferential wall of the outer shaft,
    a nested engagement portion is disposed on the circumferential wall of the nested shaft, and
    the outer engagement portion and the nested engagement portion are configured to be engaged to an actuator.

7. An HVAC system for a vehicle, comprising:
    a blower configured to blow air in an airflow direction;
    an evaporator disposed downstream of the blower in the airflow direction;
    a heater disposed downstream of the evaporator in the airflow direction; and
    the rotary shaft assembly of claim 1, wherein
    the fluid passage is defined in the HVAC system and allows the air, as the fluid, to flow therethrough, and
    the rotary shaft assembly is coupled with the door and moves the door to change the airflow direction.

8. The HVAC system of claim 7, wherein
    the door is a slide door coupled to gear teeth disposed about the rotary shaft assembly.

9. The HVAC system of claim 7, wherein
    the door is a rotary door directly attached to the rotary shaft assembly.

10. The rotary shaft assembly of claim 1, wherein
    the fluid passage is defined in an HVAC system for a vehicle and allows air, as the fluid, to flow therethrough,
    the door is located in the fluid passage and change an airflow direction of the air, and
    when the relative rotation angle is the first angle, (i) the nested shaft takes the air into the second passage through the outer opening and the nested opening and (ii) the open end discharges the air from the second passage to an outside of the HVAC system.

* * * * *